No. 881,823. PATENTED MAR. 10, 1908.
J. N. PERKINS.
ATTACHMENT FOR MOLDERS' FLASKS.
APPLICATION FILED SEPT. 4, 1907.

WITNESSES

INVENTOR
John N. Perkins
BY
ATTORNEYS

THE NORRIS PETERS CO., WASHINGTON, D. C.

UNITED STATES PATENT OFFICE.

JOHN NICHOLAS PERKINS, OF RICHMOND, VIRGINIA, ASSIGNOR OF ONE-HALF TO LAWRENCE B. GRASBERGER, OF RICHMOND, VIRGINIA.

ATTACHMENT FOR MOLDERS' FLASKS.

No. 881,823.    Specification of Letters Patent.    Patented March 10, 1908.

Application filed September 4, 1907. Serial No. 391,353.

*To all whom it may concern:*

Be it known that I, JOHN NICHOLAS PERKINS, a citizen of the United States, and a resident of Richmond, in the county of Henrico and State of Virginia, have invented new and useful Improvements in Attachments for Molders' Flasks, of which the following is a full, clear, and exact description.

This invention resides in certain new and useful improvements in attachments for molders' flasks, relating more especially to improvements in the socket members which are usually fixed to the side of the drag and receive the dowels or pins attached to the cope and operating to direct and retain these parts of the molds in perfect register when they are assembled.

The object primarily of the invention is to provide a socket member preferably of an adjustable nature in which there will be no hanging or binding when separating the cope and drag, whereby they may be freely taken apart and placed together. This object I accomplish by my invention without leaving any sidewise or endwise play between the cope and drag when connected, thus holding them in perfect register without danger of lateral displacement.

Figure 1:
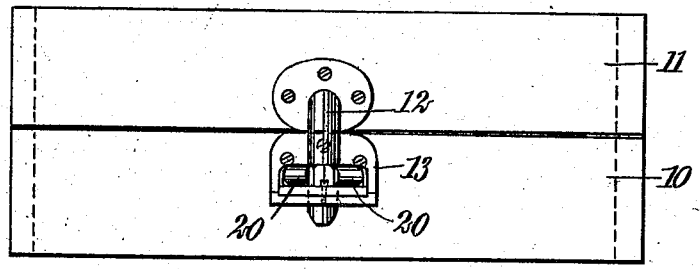
Figure 2:
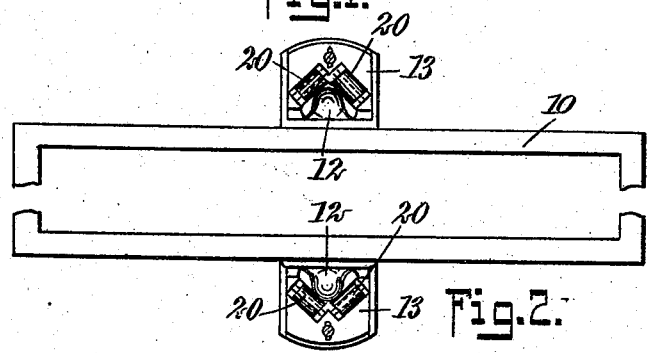
Figure 3:
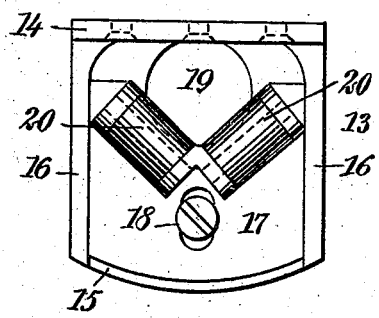
Figure 4:
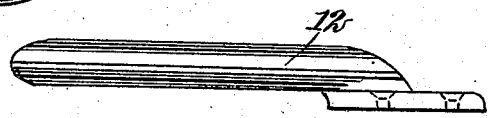
Figure 5:
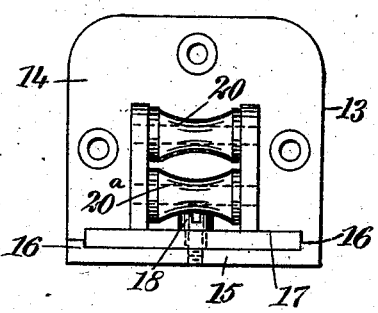
Figure 6:
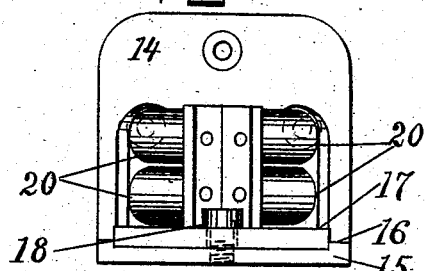

Reference is to be had to the accompanying drawings forming a part of this specification, in which similar characters of reference indicate corresponding parts in all the views:

Figure 1 is a side elevation of a mold showing the preferred embodiment of my improved attachment applied thereto; Fig. 2 is a plan of the mold shown in Fig. 1; Fig. 3 is a plan of the socket member on an enlarged scale, which is the principal feature of my invention; Fig. 4 is a side view of a dowel-pin which is attached to one of the mold sections and is received in the socket member secured to the opposite mold section; Fig. 5 is a front elevation of a modified form of my improved socket member, and Fig. 6 is a further modification of the same.

In order to illustrate the application of my invention, I have shown in Figs. 1 and 2 a molder's flask consisting of a drag 10 and a cope 11. To these mold sections is ordinarily secured an attachment for holding them in register when the cope and drag are assembled. This attachment is composed as a rule of a flask-dowel or a flask-pin 12 which is usually fixed to the cope at each side, and is received in a socket member 13 fixed to the drag when the mold sections are placed together. This although being shown round may be of any other desired cross sectional shape.

The socket member 13 of my invention preferably comprises a bracket consisting of two plates 14 and 15 disposed at substantially right angles to each other; the plate 14 being provided with screw-holes or other devices for fixing it to the side of the mold, and the plate 15, which projects from the side of the mold when attached thereto, being provided with ribs 16 at opposite sides on its upper face, which form a guideway for slidably receiving a guide-plate 17, the latter being secured in adjusted position by a set-screw 18 passing through a slot of, and threaded into, the plates, 17 and 15, respectively. The plate 15, adjacent to the plate 14, is provided with an opening 19 of such extent and shape as to freely admit the flask-pin 12 when the mold sections are connected.

The construction of the socket member thus far described is in the main old, in connection with which is the essential feature of my improvement, consisting of frictionless elements carried by the plate 17 and arranged about the opening 19, these elements preferably being in the nature of rollers 20 which have their opposite reduced ends journaled in bearings, and in that form of my invention illustrated in Figs. 1, 2 and 3, the said rollers are arranged at an angle to each other of substantially forty-five degrees. It is evident from this construction that when the socket members are applied to one of the mold sections, as illustrated in Fig. 2, a bearing on each of the flask-pins will be afforded at two points, which will prevent the cope and drag from being shifted relatively to each other in either an endwise or sidewise direction, thus securely holding these parts when assembled against any lateral displacement. By means of the adjustment of the sliding-plate 17, the roller 20 may be set against the pins as firmly as desired.

In Fig. 5 I have illustrated a slightly modified form of the socket member 13, the same being in all respects like that shown in Figs. 1, 2 and 3, with the exception that the rollers 20ª instead of being arranged at an angle to each other and circumferentially grooved, are located at the outside of the opening 19 one above the other, and substantially parallel to the plate 14, and consequently to the side of the mold when the socket member is secured thereto.

Fig. 6 is a still further modification of my improvement, which is essentially the same as that shown in Figs. 1, 2 and 3, except that two sets of rollers are provided with one roller arranged above the other. With this construction it is not possible to rock the top flask after it has been raised slightly.

It is obvious that other forms of my invention from those shown may be made, and I consider I am entitled to such modifications as fall within the scope of the annexed claims.

Having thus described my invention, I claim as new and desire to secure by Letters Patent:

1. A socket member for molders' flasks comprising a bracket composed of two plates arranged at substantially right angles to each other, one of said plates being adapted to be secured to the mold and the other of said plates having ribs at its opposite sides forming a guideway and provided with an opening, and a plate adjustable in said guideway having rollers arranged about said opening.

2. A socket member for molders' flasks comprising a bracket having an opening, and a roller bearing carried by said bracket arranged about said opening.

3. A socket member for molders' flasks comprising a bracket having an opening, a plate adjustable on the bracket, and rollers carried by the plate arranged about said opening.

4. A socket member for molders' flasks comprising a bracket having an opening, and two rollers arranged at an angle to each other about said opening and carried by the bracket.

5. In a molder's flask, mold sections, a flask-pin carried by one of said sections, and a socket member fixed to the other mold section having roller elements for receiving and forming a bearing for the pin.

6. In a molder's flask, mold sections, a flask-pin carried by one of said sections, and a socket member fixed to the other mold section having rollers arranged at an angle to each other for receiving and forming a bearing for the pin.

7. In a molder's flask, mold sections, a flask pin carried by one of said sections, and a socket member carried by the other mold section having a roller for forming a bearing for the pin.

In testimony whereof I have signed my name to this specification in the presence of two subscribing witnesses.

JOHN NICHOLAS PERKINS.

Witnesses:
    LAWRENCE B. GRASBERGER,
    I. V. HUGHES.